(12) United States Patent
Kitamura

(10) Patent No.: US 6,316,902 B1
(45) Date of Patent: Nov. 13, 2001

(54) STEP MOTOR DRIVE CONTROL CIRCUIT

(75) Inventor: Shingo Kitamura, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/455,411

(22) Filed: Dec. 6, 1999

(30) Foreign Application Priority Data

Dec. 7, 1998 (JP) .................................................. 10-363829

(51) Int. Cl.7 ................................................... G05B 11/01
(52) U.S. Cl. ............................ 318/671; 318/673; 318/685
(58) Field of Search .................................... 318/671, 672, 318/673, 685, 696, 432–433

(56) References Cited

U.S. PATENT DOCUMENTS 5,841,261 * 11/1998 Nojima et al. ........................ 318/696
6,014,003 * 1/2000 French ................................... 318/696
6,114,826 * 9/2000 Nishiura et al. ...................... 318/685

* cited by examiner

Primary Examiner—Marlon T. Fletcher
(74) Attorney, Agent, or Firm—Fitzpatrick, Cella, Harper & Scinto

(57) ABSTRACT

A step motor drive control circuit, which is suitably employed in an image scanner, reduces the uneven rotation characteristics of a step motor and improves the scanning quality in the image scanner. The step motor drive control circuit generates a phase signal for driving the step motor from a phase signal generator in accordance with a driving pulse signal. The step motor drive control circuit controls switching devices of a driver in accordance with the phase signal so as to perform bipolar driving of the step motor. The step motor drive control circuit includes at least two switching devices with different switching characteristics in order that bipolar driving of the step motor is performed. A constant-current signal from a constant-current signal generator is added to the switching devices, thereby setting switching characteristics of the switching devices to be uniform.

7 Claims, 8 Drawing Sheets

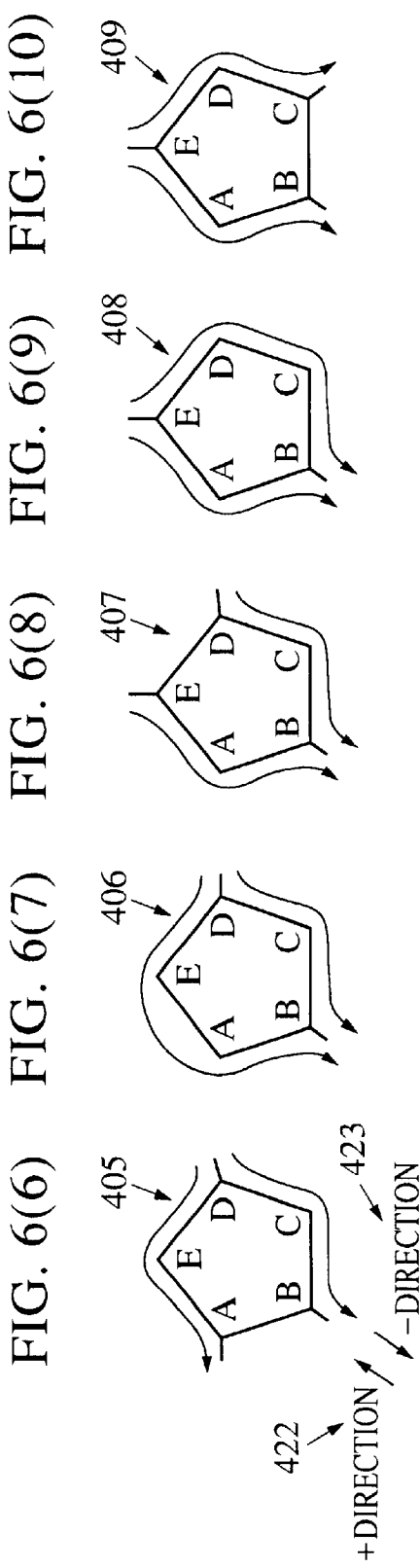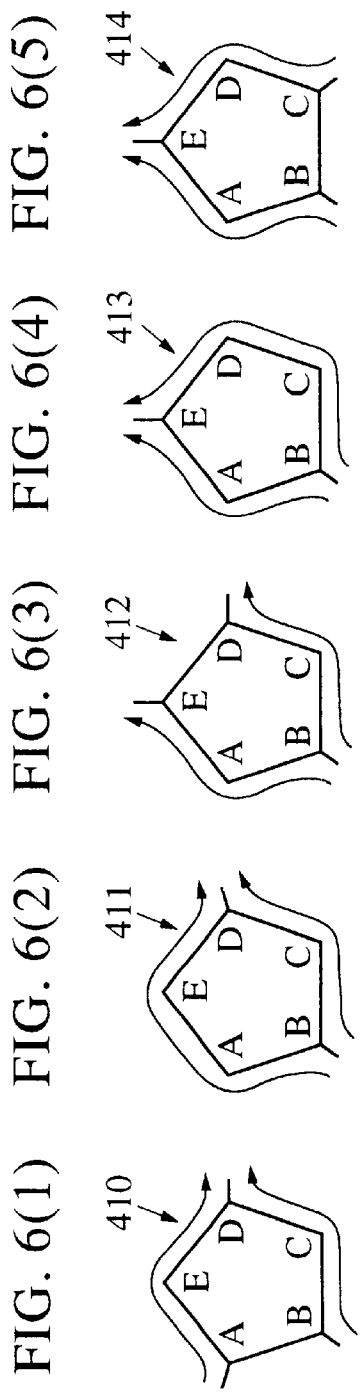

STEP MOTOR DRIVE CONTROL CIRCUIT

BACKGROUND OF THE INVENTION

1. Field of the Invention

The present invention relates to step motor drive control circuits, which are applicable to image scanners and the like.

2. Description of the Related Art

Hitherto, bipolar driving of a step motor has been performed by controlling a p-channel switching device and an n-channel switching device. Thus, there has been a slight difference between the current waveform by p-channel switching when supplying an electric current to a motor winding and the current waveform by n-channel switching when drawing the electric current from the motor winding.

As a result, for example, half-step drive of a five-phase step motor causes uneven rotation of the motor, which appears every one-quarter cycle of a motor drive frequency, due to the difference between switching characteristics of the p-channel and the n-channel.

Image scanners used in color copying machines or other suitable devices preferably employ step motors as the primary drive source due to the necessity for high accuracy positioning. However, when an image is scanned using a motor having an uneven rotation characteristic as described above, vibrations are generated in the mechanism and fine details in the image become jagged. As a result, the quality of the scanned image is degraded.

SUMMARY OF THE INVENTION

Accordingly, it is an object of the present invention to provide a step motor drive control circuit in which switching characteristics of switching devices performing bipolar driving are set to be uniform.

It is another object of the present invention to eliminate or reduce uneven rotation characteristics in a step motor, thus achieving smooth rotation.

It is another object of the present invention to provide a step motor which improves scanning quality in an image scanner.

Further objects, features, and advantages of the present invention will be apparent from the following description of the preferred embodiments with reference to the attached drawings.

BRIEF DESCRIPTION OF THE DRAWINGS

FIGS. 6(1) to 6(10) illustrate how an electric current flows in the step motor shown in FIG. 4;

DESCRIPTION OF THE PREFERRED EMBODIMENT

Figure 1:
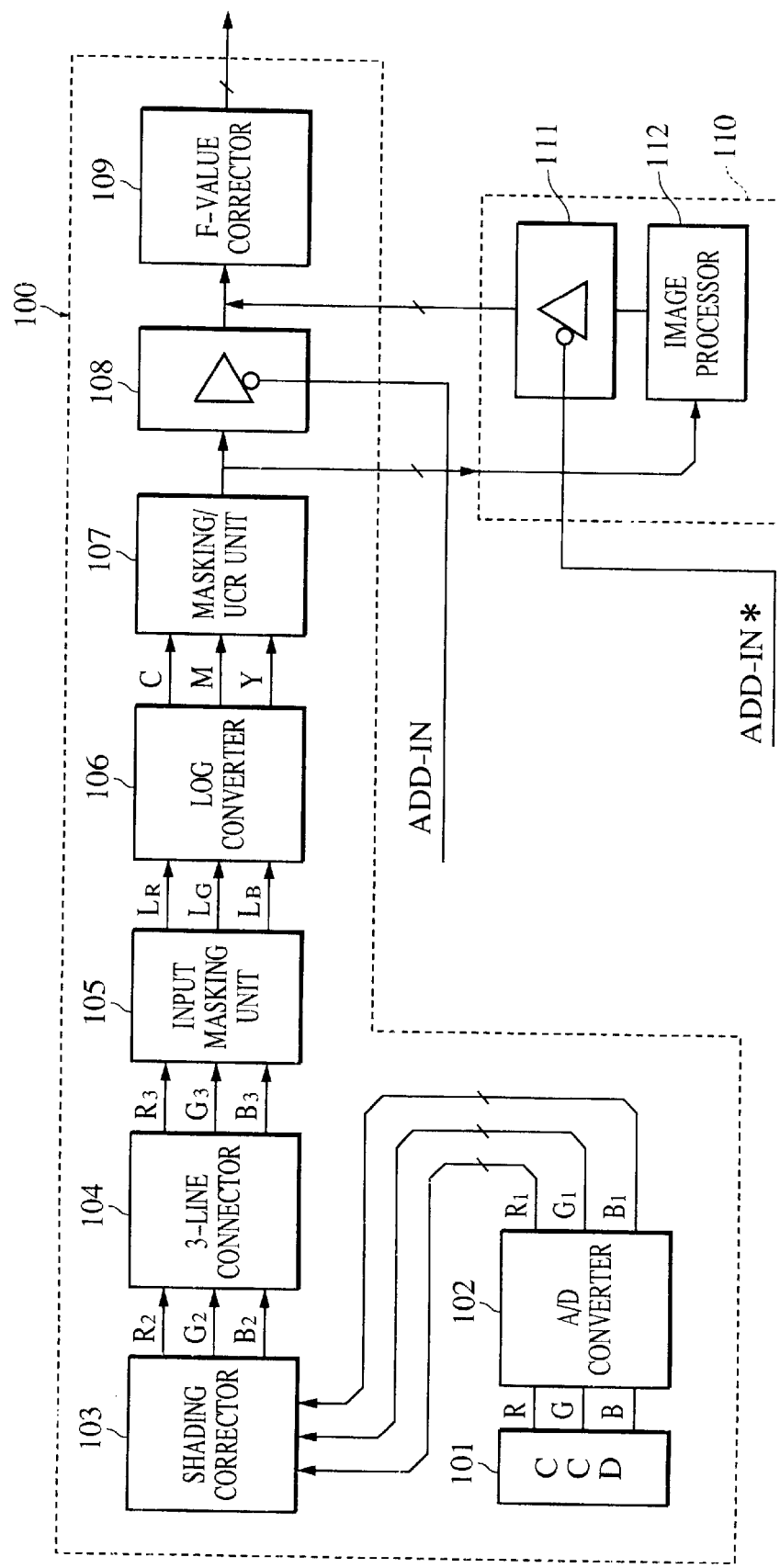
FIG. 1 is a block circuit diagram showing an image processing circuit of a digital full-color copying machine according to the present invention.

FIG. 1 is a block diagram of an image processing circuit of a digital full-color copying machine, in which a step motor drive control circuit according to an embodiment of the present invention is suitably incorporated. Referring to FIG. 1, a main part 100 of the image processing circuit includes the following circuit elements: a three-line CCD 101 for receiving light reflected from a document and converting the light into an electrical signal by color separation processing of the reflected light; an analog-to-digital (A/D) converter 102 for converting an analog signal (RGB) from the CCD 101 into a digital signal ($R_1G_1B_1$); and a shading corrector 103 for correcting the sensitivity of each pixel of the CCD 101 and the gradient of light intensity of light from a light source. The shading corrector 103 outputs $R_2$, $G_2$, and $B_2$ signals. In FIG. 1, a red signal ($R_1$), a green signal ($G_1$), and a blue signal ($B_1$) are 8-bit digital image signals output by the A/D converter 102.

The CCD 101 employed in this embodiment includes three CCD line sensors for each of the R, G, and B signals. Each CCD line sensor is disposed at a predetermined spacing, so that the digital image signals have a time lag generated by a space gap. A three-line connector 104 corrects this time lag and outputs time lag corrected signals $R_3$, $G_3$, and $B_3$.

An input masking unit 105 executes operations for correcting RGB spectral characteristics of the CCD 101 to a standard RGB space. A LOG converter 106 includes a look-up table formed by a RAM, in which an R luminance signal ($L_R$), a G luminance signal ($L_G$), and a B luminance signal ($L_B$) are converted, respectively, into a cyan concentration signal (C), a magenta concentration signal (M), and a yellow concentration signal (Y).

A masking under-color-or-removal (UCR) unit 107 executes operations for eliminating muddiness in the colors of the toner used for printing from the input C, M, and Y concentration signals. Accordingly, the masking UCR unit 107 outputs a signal computed for each input signal. An F-value corrector 109 includes a correcting table for correcting a concentration value (F-value) of each color in accordance with a designation of print concentration.

A tri-state buffer 108 is controlled by an ADD-IN signal. A sub part 110 of the image processing circuit includes a tri-state buffer 111 and an image processor 112. The image processor 112 performs processing, such as extraction of the outline of an image. An inverted signal of the ADD-IN signal is input to the tri-state buffer 111. Accordingly, the tri-state buffers 108 and 111 are complementary to each other; while one has a high impedance, the other has a low impedance. Specifically, when the ADD-IN signal is "1", the tri-state buffer 108 has a high impedance, and the image signal passes through the masking UCR unit 107, the image processor 112, the tri-state buffer 111, and the F-value corrector 109. Conversely, when the ADD-IN signal is "0", the tri-State buffer 111 has a high impedance, and the image signal passes through the masking UCR unit 107, the tri-state buffer 108, and the F-value corrector 109.

Figure 2:
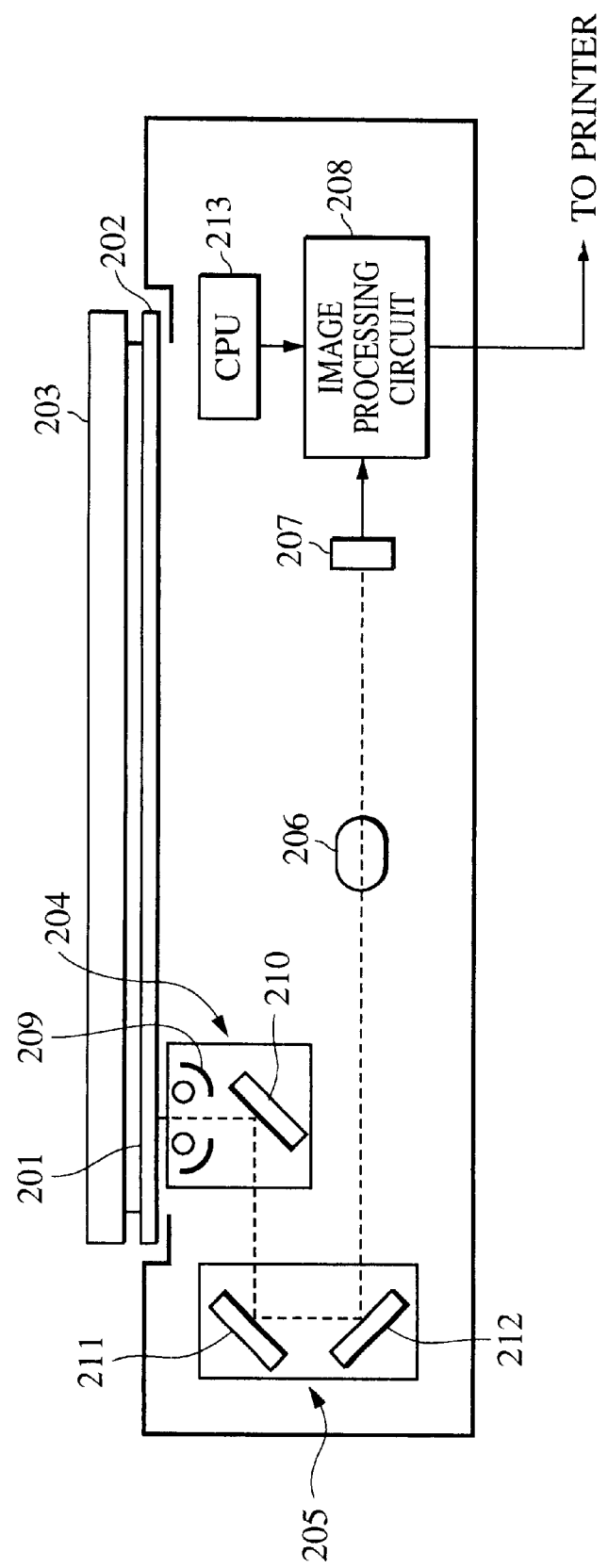
FIG. 2 is a block diagram showing an image scanner including the image processing circuit shown in FIG. 1.

FIG. 2 is a block diagram of a color image scanner including an image processing circuit. Referring to FIG. 2, the color image scanner includes, in the upper part thereof, a document stand glass 202 on which a document 201 is placed and a document stand cover 203 for holding down the placed document 201. The color image scanner includes an optical system in the lower part thereof. The optical system consists of a document illuminating lamp 209, a first mirror stand 204, a second mirror stand 205, an imaging lens 206, a color CCD (fixed pixel) line sensor 207 including a three-color separation filter (not shown) for separating light into R, G, and B components, and an image processing circuit 208. A mirror 210 is fixed on the first mirror stand 204, and mirrors 211 and 212 are fixed on the second mirror stand 205.

A CPU 213, which is connected to the image processing circuit 208, controls operation of the image processing circuit 208. The CPU 213 controls operation of the document illuminating lamp 209 via a drive circuit (not shown) as well as the first mirror stand 204 and the second mirror stand 205 via a drive mechanism (not shown). The first mirror stand 204 and the document illuminating lamp 209 scan the document 201 placed on the document stand glass 202 twice as fast as the second mirror stand 205.

The document 201 placed on the document stand glass 202 is illuminated by the document illuminating lamp 209. Light reflected from the document 201 is directed by the mirrors 210, 211, and 212, thus forming an image on the line sensor 207 via the imaging lens 206. The reflected light is separated by the color separation filter of the line sensor 207 into an R component, a G component, and a B component as color image information, which in turn is sent to the image processing circuit 208. Repetitions of electrical scanning (main scanning) by the line sensor 207 and mechanical scanning (sub scanning) by the document illuminating lamp 209 and the mirrors 210, 211, and 212 permit scanning of the image information of the overall document. The image processing circuit 208 performs predetermined image processing on the input image information and outputs a resultant image signal to an external printer connected thereto or to any other suitable device.

Figure 10:
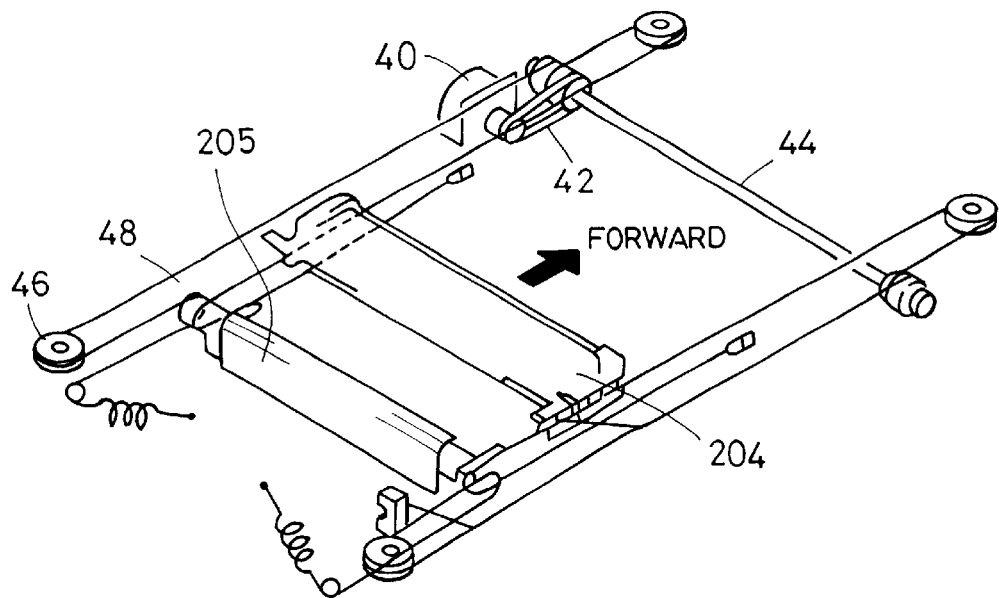
FIG. 10 is a perspective view of a moving mechanism of the image scanner shown in FIG. 2.

FIG. 10 is a perspective view of a moving mechanism for moving the image scanner shown in FIG. 2. The arrangement of the moving mechanism shown in FIG. 10 has been incorporated in known flatbed scanners. For scanning a document, the first mirror stand 204 on which the document illuminating lamp 209 and the mirror 210 (see FIG. 2) are mounted moves, for example, in the direction of the arrow at a predetermined speed. The second mirror stand 205 on which the mirror 211 and the mirror 212 are mounted moves at a speed half as fast as the speed of the first mirror stand In order that the first mirror stand 204 and the second mirror stand 205 move, rotational motion is transferred from a motor 40 via a belt 42 to a rotating shaft 44. The rotation of the rotating shaft 44 is transferred to a belt 48 stretched on a pulley 46. The first mirror stand 204 is attached to the belt 48. The second mirror stand 205 is driven by the belt 48 via a mechanism moving half as fast as the first mirror stand 204.

When the first mirror stand 204 and the second mirror stand 205 move in the direction of the arrow and scan the document image, it is preferable that vibrations in the first mirror stand 204 and the second mirror stand 205 be as small as possible in order to obtain a high-quality image with less discontinuity. However, a five-phase step motor drive system which fails to uniformly set switching characteristics of switching devices performing bipolar driving causes uneven rotation. When the first mirror 210 is driven, a vibration is generated, substantially degrading the quality of the scanned image.

Described below are a motor drive control circuit which fails to uniformly set switching characteristics and causes uneven rotation. After that, a drive control circuit according to the present invention which reduces the uneven rotation characteristics is described. The drive control circuit according to the present invention smoothly rotates a step motor and substantially improves quality of a scanned image.

Figure 3:
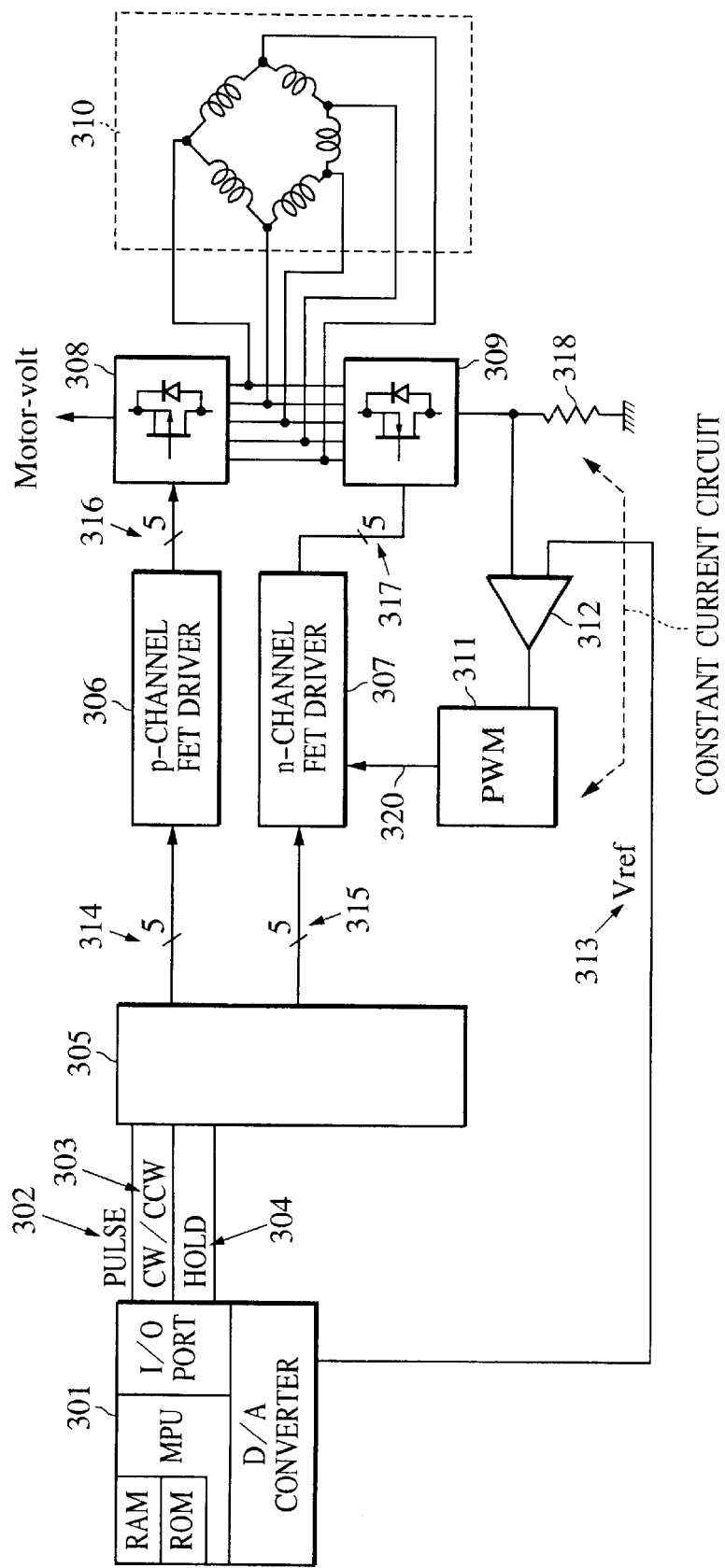
FIG. 3 is a circuit diagram showing a drive control circuit for a five-phase step motor.

FIG. 3 is a circuit diagram of a drive control circuit for a five-phase step motor. The drive control circuit applies a constant-current signal exclusively to an n-channel FET driver for controlling the step motor. Referring to FIG. 3, an MPU 301 outputs a control signal necessary for activating the step motor. The MPU 301 includes therein a RAM, a ROM, a D/A Converter, and an I/O port. The built-in I/O port outputs, as output signals, a driving pulse 302 of the step motor, a rotation direction signal 303 of the step motor, and a hold signal 304 for either connecting or disconnecting electric power supplied to the step motor.

The driving pulse 302 is a driving reference pulse of the step motor. One pulse of the driving pulse 302 equals one step angular rotation of the step motor. The rotation direction signal 303 determines the rotation direction of the motor. In FIG. 3, as viewed from an output shaft of the step motor, when the rotation direction signal 303 is low ("L"), the motor rotates in the counterclockwise direction; when the rotation direction signal 303 is high ("H"), the motor rotates in the clockwise direction.

When the hold signal 304 is "H", electric power is supplied to the motor; when the hold signal is "L", electric power is cut off. The built-in D/A converter outputs a reference voltage $V_{ref}$ 313 to a comparator circuit of a constant-current circuit in accordance with the electric current supplied to the step motor.

With continued reference to FIG. 3, a phase signal generating circuit 305 generates, in accordance with the driving pulse 302, an excitation signal of each phase in order to activate the five-phase step motor. The phase signal generating circuit 305 is designed to generate a clockwise phase signal of counterclockwise phase signal in accordance with the rotation direction signal 303. When the hold signal 304 is "H", the phase signal is permitted to be output; when the hold signal 304 is "L", the phase signal is not output. Since electric power is supplied to the motor in accordance with the phase signal, no electric power is supplied to the motor when no phase signal is output.

In FIG. 3, a p-channel driving phase signal 314 and an n-channel driving phase signal 315 come from the phase signal generating circuit 305. A p-channel FET driver 306 outputs a p-channel FET driving signal 316. An n-channel FET driver 307 outputs an n-channel FET driving signal 317. An FET array 308 applies electric current to the motor. An FET array 309 draws electric current from the motor. Also shown in FIG. 3 the drive motor is a five-phase step motor The phase signal generated by the phase signal generating circuit 305 Is input to the FET drivers 306 and 307, which in turn is converted into the FET driving signals 316 and 317 to be input to the FET arrays 308 and 309. The FET arrays 308 and 309 pass electric current to the five-phase step motor 310 incorporating a predetermined five-phase driving sequence that activates the step motor 310.

The following operation is performed to adjust the electric current flowing in the motor to a predetermined value. A resistor 318 detects the current flowing in the motor and converts the current into a voltage. A comparator 312 compares the voltage detected by the resistor 318 in accordance with the current flowing in the motor with the constant-current reference voltage 313. A PWM circuit 311 varies the current to be supplied to the motor in accordance with the comparison result obtained by the comparator 312. A PWM signal 320 generated by the PWM circuit 311 is input into the n-channel FET driver 307, which in turn in added to the n-channel phase signal, thereby controlling the current flowing in the motor. The comparator circuit 312 compares the current value of the current flowing in the step motor with a programmed current value. The PWM circuit 311 generates the PWM signal 320 in accordance with the comparison result. When the current value of the current flowing in the motor is greater than the programmed current value, the PWM signal 320 is an OFF signal. When the current value of the current flowing in the motor is smaller than the programmed current value, the PWM signal 320 is an ON signal. In accordance with the PWM signal 320, the voltage applied to the step motor is turned ON/OFF.

Figure 11:
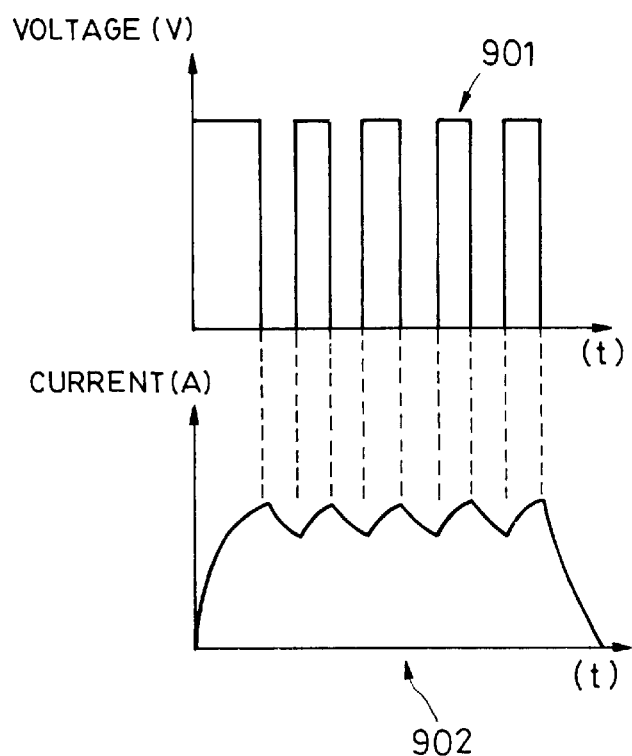
FIG. 11 is an illustration of waveforms used in a constant-current control circuit of the drive control circuit shown in FIG. 7.

FIG. 11 illustrates the above condition. Referring to FIG. 11, when a voltage 901 is applied to a motor winding, an electric current flowing in the motor winding seemingly becomes a current 902. Thus, a constant current flows in the motor in accordance with the constant-current reference voltage 313.

Now referring to FIGS. 4 to 6, how an electric current flows in a five-phase step motor is described below.

Figure 4:
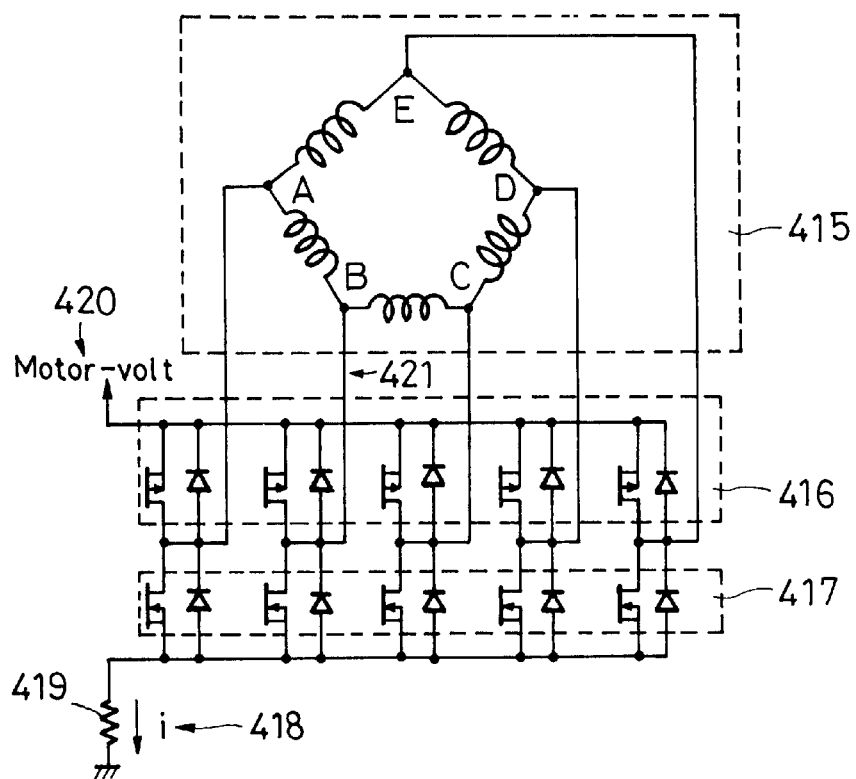
FIG. 4 is a circuit diagram showing a drive circuit of the step motor shown in FIG. 3.

FIG. 4 shows a five-phase step motor 415 (Corresponding to the five-phase step motor 310 in FIG. 3), a p-channel FET array 416 (corresponding to the FET array 308 in FIG. 3), an n-channel FET array 417 (corresponding to the FET array 309 in FIG. 3), a voltage 420 applied to the motor, a current detecting resistor 419, and a current 418 flowing in the motor.

Figure 5:
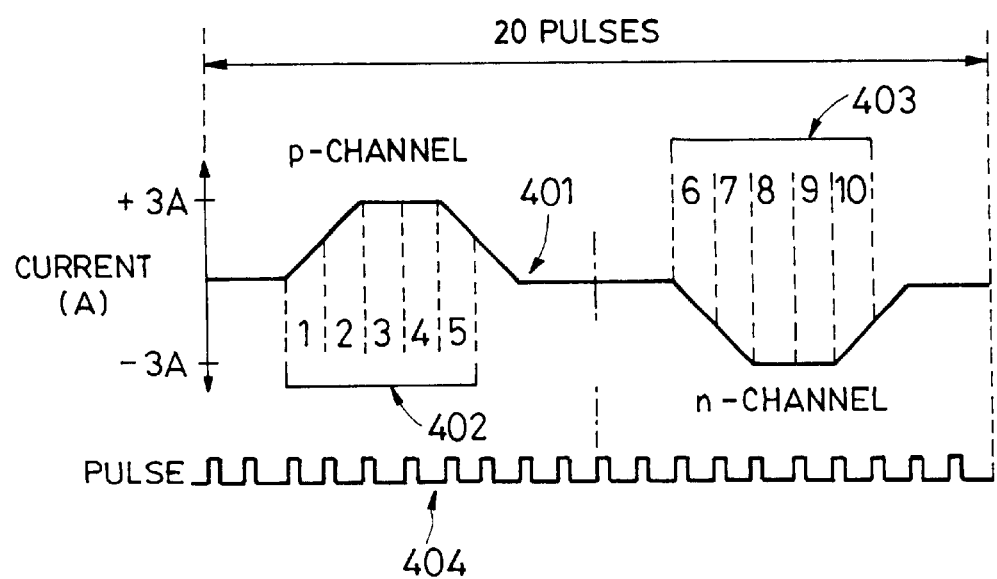
FIG. 5 is a waveform chart showing d drive current of the step motor shown in FIG. 4.

Referring to FIG. 5, the current to be supplied to the motor is added to a driving reference pulse signal 404 of the three-ampere constant-current step motor 415, thereby performing a four/five-phase excitation driving operation. Described below by example is a current 421 flowing in B-phase shown in FIG. 4, However, the same applies to the other phases. Referring back to FIG. 5, a waveform 401 represents a current waveform 401 flowing in the B-phase of the motor.

With continued reference to FIG. 5, numerals 1 to 10 indicate a current flow, but the remaining part shows that there is no current flow in B phase 421. In the four/five-phase excitation operation, the current waveform 401 flowing in the B-phase of the motor is repeated in a cycle of a 20-step driving reference pulse signal 404.

Now referring to FIGS. 6(1) to 6(10), illustrations 405 to 414 show how the electric current flows in the motor. The current is represented by the +direction 422 and the −direction 423. Referring back to FIG. 5, current flow numerals 1 to 5 (collectively current flow 402) show that the B-phase current flows in the +direction, in which the current flowing in the five-phase step motor corresponds to current flow illustrations 410 to 414 shown in FIGS. 6(1) to 6(5). With continued reference to FIG. 5, current flow numerals 6 to 10 (collectively current flow 403) indicate that the B-phase current flows in the −direction, where the current flowing in the five-phase step motor corresponds to current flow illustrations 405 to 409 shown in FIGS. 6(6) to An ideal current waveform of the B-phase of the motor closely resembles the waveform 401 illustrated in FIG. 5. However, when there is a difference between switching characteristics of the p-channel and n-channel FET arrays, the current waveform flowing in the B-phase in the +direction does not match that in the −direction. The number of the reference pulse, which is represented by illustrations 402 and 403 indicative of the current flow, is five pulses out of the 20-pulse motor driving reference pulse 404. Hence, uneven rotation of the motor is caused every $5/20=1/4$ cycle with respect to the frequency of the motor driving pulse signal.

Figure 8:
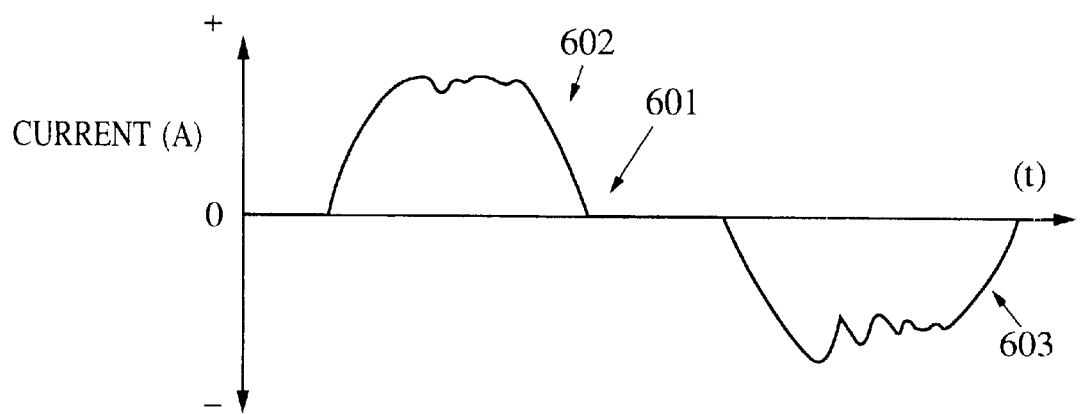
FIG. 8 is a waveform chart showing a B-phase current of the step motor shown in FIG. 3.

This problem largely results from adding the PWM signal to only one of the p-channel FET array and the n-channel FET. In that case, the switching characteristics of the p-channel and the n-channel do not agree with each other. FIG. 8 is a waveform chart showing a B-phase current incorporating this circuit.

Figure 7:
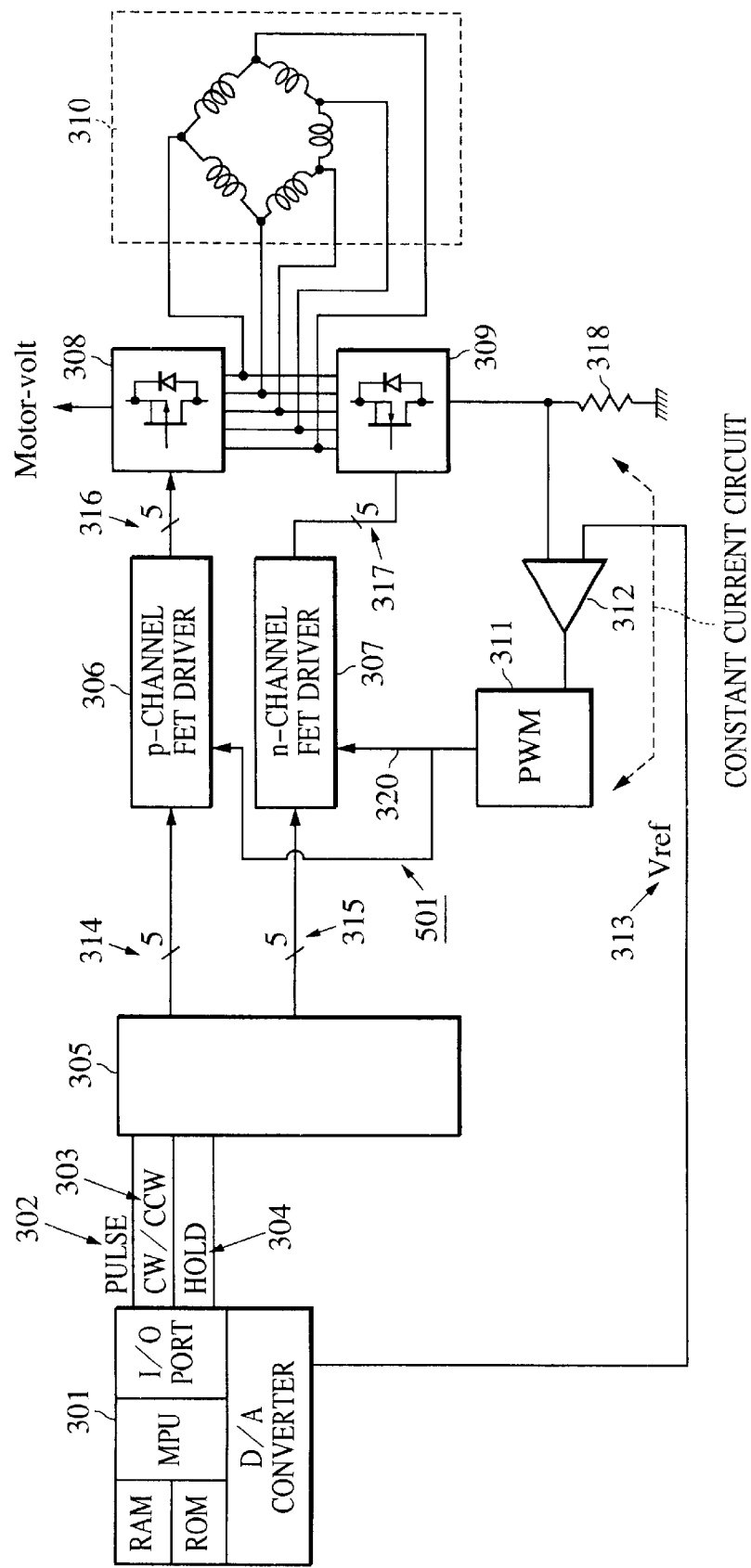
FIG. 7 is a circuit diagram showing a drive control circuit of a five-phase step motor according to an embodiment of the present invention.

FIG. 7 is a circuit diagram showing a drive control circuit of a five-phase step motor according to the present invention. In the drive control circuit, a PWM signal 501 is added to both p-channel and n-channel FET drivers in order that switching characteristics of p-channel and n-channel FET arrays agree with each other. The rest of the circuit configuration is exactly the same as the drive control circuit of the five-phase step motor shown in FIG. 3.

Figure 9:
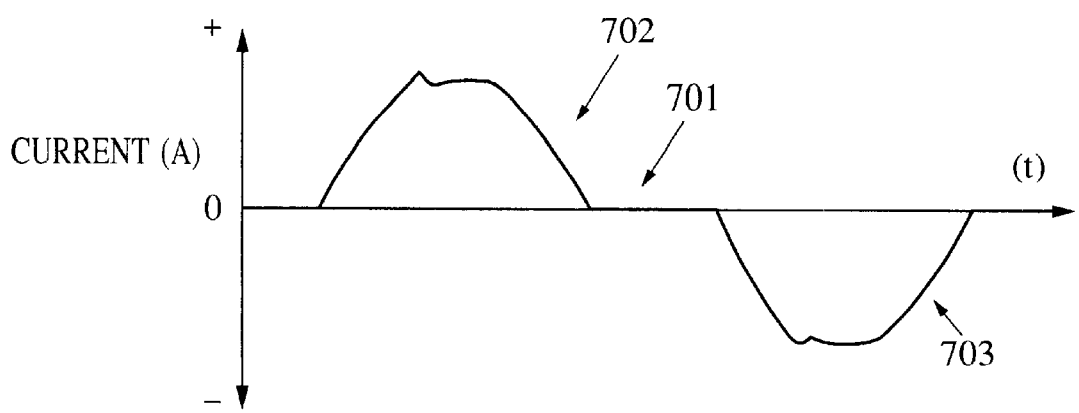
FIG. 9 is a waveform chart showing a B-phase current of the step motor shown in FIG. 7.

Referring to FIG. 9, a waveform flowing in the B-phase of the motor is illustrated when the switching characteristics of the p-channel and n-channel FET arrays are the same. A current waveform 701 is substantially the same as the ideal current waveform described above, suppressing uneven rotation caused every one-quarter of the step motor rotational frequency. The shaped waveform suppresses the uneven rotation of the step motor caused in other cycles.

According to the present invention, there is provided a step motor drive circuit which reduces the uneven rotation characteristics in a step motor chiefly caused when the step motor is driven by the step motor drive circuit. This is feasible without a drastic modification compared with the known driving system. Incorporation of the step motor drive circuit of the present invention in an image scanner improves quality of a scanned image.

While the present invention has been described with reference to what are presently considered to be the preferred embodiments, it is to be understood that the invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A drive circuit for a step motor, comprising:

switching means for passing electric current to the step motor, said switching means including a p-channel switching device and an n-channel switching device, for bipolar driving the step motor;

phase signal generating means for generating a p-channel phase signal and an n-channel phase signal in accordance with driving pulse signals;

driving means for generating a p-channel driving signal and an n-channel driving signal in accordance with the n-channel phase signal and the p-channel phase signal generated by said phase signal generating means, wherein the p-channel driving signal and the n-channel driving signal are applied to the p-channel switching device and the n-channel switching device, respectively;

detecting means for detecting electric current flowing through the step motor; and pulse width modulating (PWM) means for generating a PWM signal based on the electric current detected by said detecting means, wherein the PWM signal is added to the n-channel phase signal and the p-channel phase signal, thereby controlling the electric current flowing through the step motor using the p-channel switching device and the n-channel switching device, so that the electric current is adjusted to a predetermined value.

2. A drive circuit according to claim 1, wherein said driving means includes a p-channel driver and an n-channel driver which generate the p-channel driving signal and the n-channel driving signal; and wherein the PWM signal is added to both the p-channel driver and the n-channel driver.

3. A drive circuit according to claim 1, wherein the p-channel switching device and the n-channel switching device are a p-channel field-effect transistor (FET) and an n-channel field-effect transistor (FET).

4. A drive circuit according to claim 1, wherein said detecting means includes:

a resistor for detecting the electric current flowing in the step motor and converting the electric current into a voltage; and comparing means for comparing the voltage detected by the resistor with a reference voltage.

5. A drive circuit according to claim 4, wherein said PWM means generates the PWM signal in accordance with a comparison result of said comparing means.

6. A drive circuit according to claim 1, wherein the step motor is an image scanning motor in an image scanner.

7. A drive circuit according to claim 1, wherein the step motor is a five-phase step motor.

* * * * *

UNITED STATES PATENT AND TRADEMARK OFFICE
CERTIFICATE OF CORRECTION

PATENT NO. : 6,316,902 B1
DATED : November 13, 2001
INVENTOR(S) : Shingo Kitamura It is certified that error appears in the above-identified patent and that said Letters Patent is hereby corrected as shown below:

Column 1,
Line 58, "d" should read -- a --.

Column 3,
Line 51, "stand" should read -- stand 204. --.

Column 4,
Line 18, "Converter," should read -- converter, --.
Line 59, "motor The" should read -- motor 310. ¶The --.
Line 60, "Is" should read -- is --.

Column 5,
Line 9, "in" should read -- is --.
Line 30, "(Corresponding" should read -- (corresponding) --.
Line 42, "FIG. 4, However," should read -- FIG. 4. However, --.
Line 65, "FIGS. 6(6) to" should read -- FIGS. 6(6) to 6(10). --.

Signed and Sealed this

Twenty-first Day of May, 2002

Attest:

Attesting Officer

JAMES E. ROGAN
*Director of the United States Patent and Trademark Office*